Jan. 4, 1966  A. HECKER ETAL  3,227,363
COIN SORTING APPARATUS
Filed Oct. 19, 1962  17 Sheets-Sheet 1

Inventors
Alfred Hecker
and
Emil Fenrich

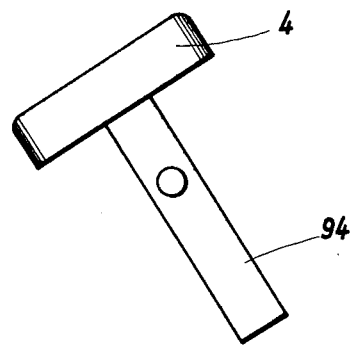
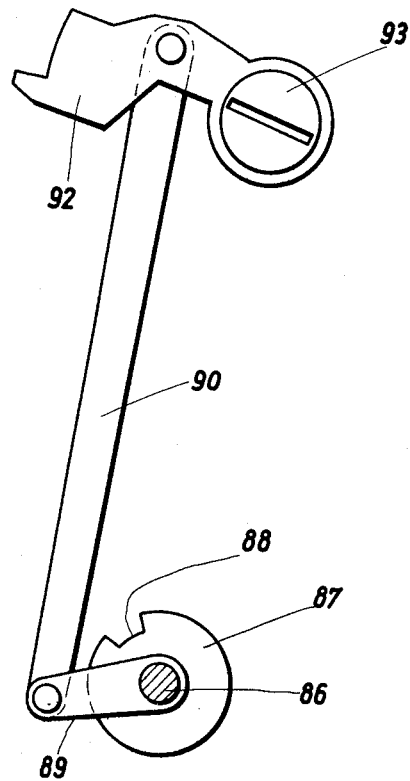
Fig. 3

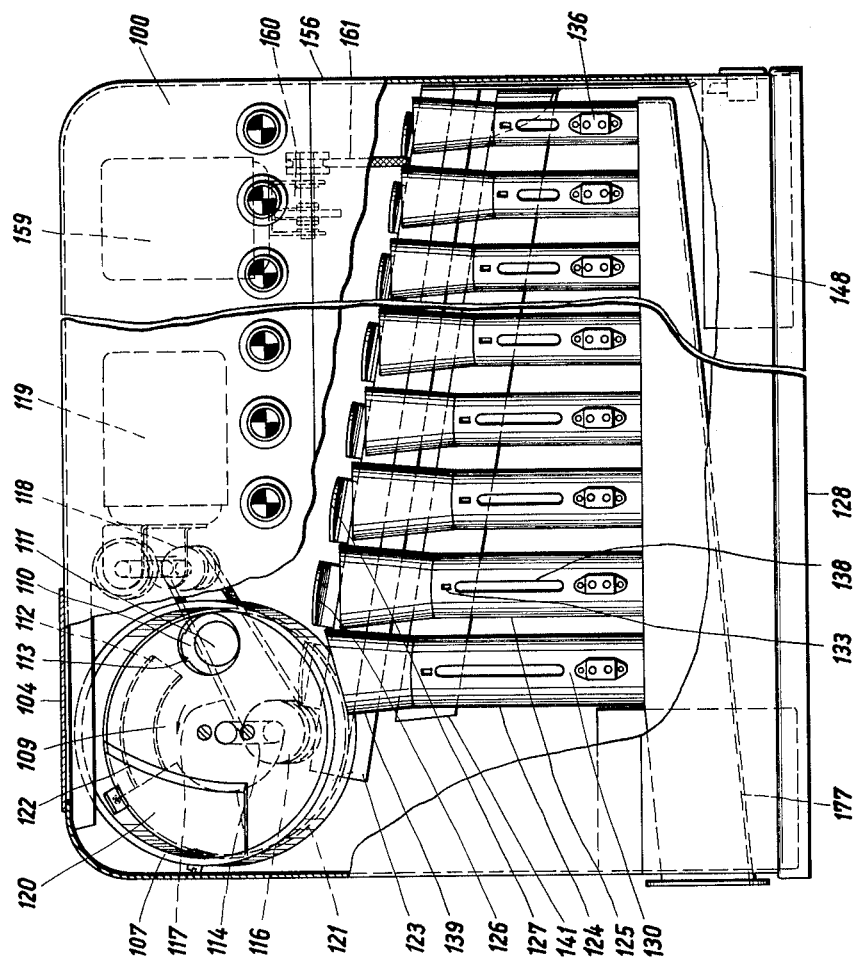

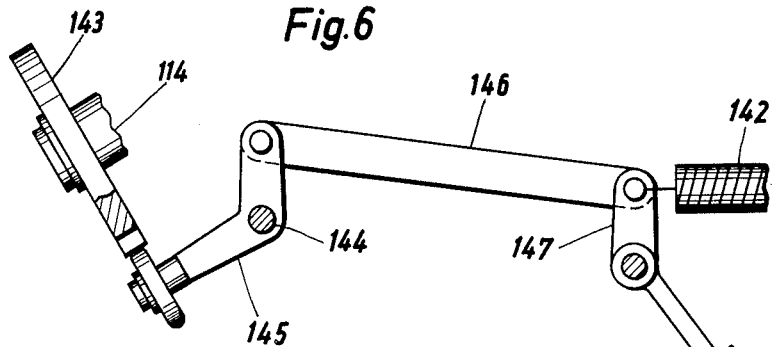
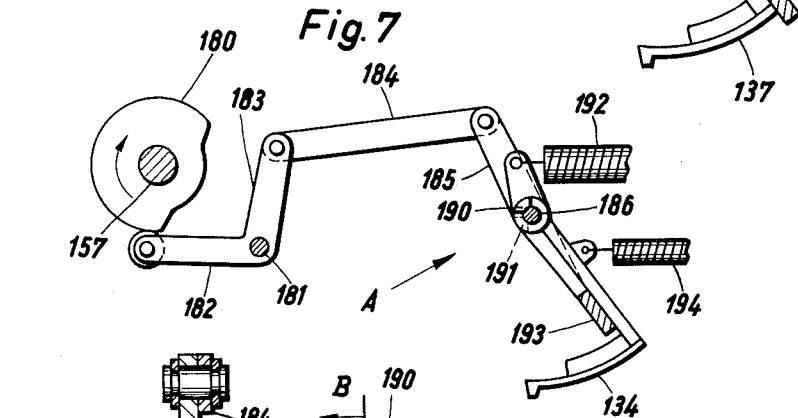
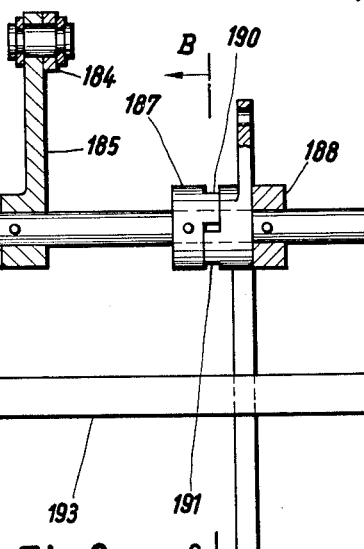
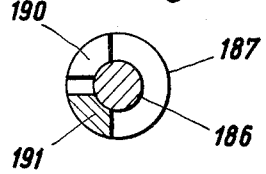

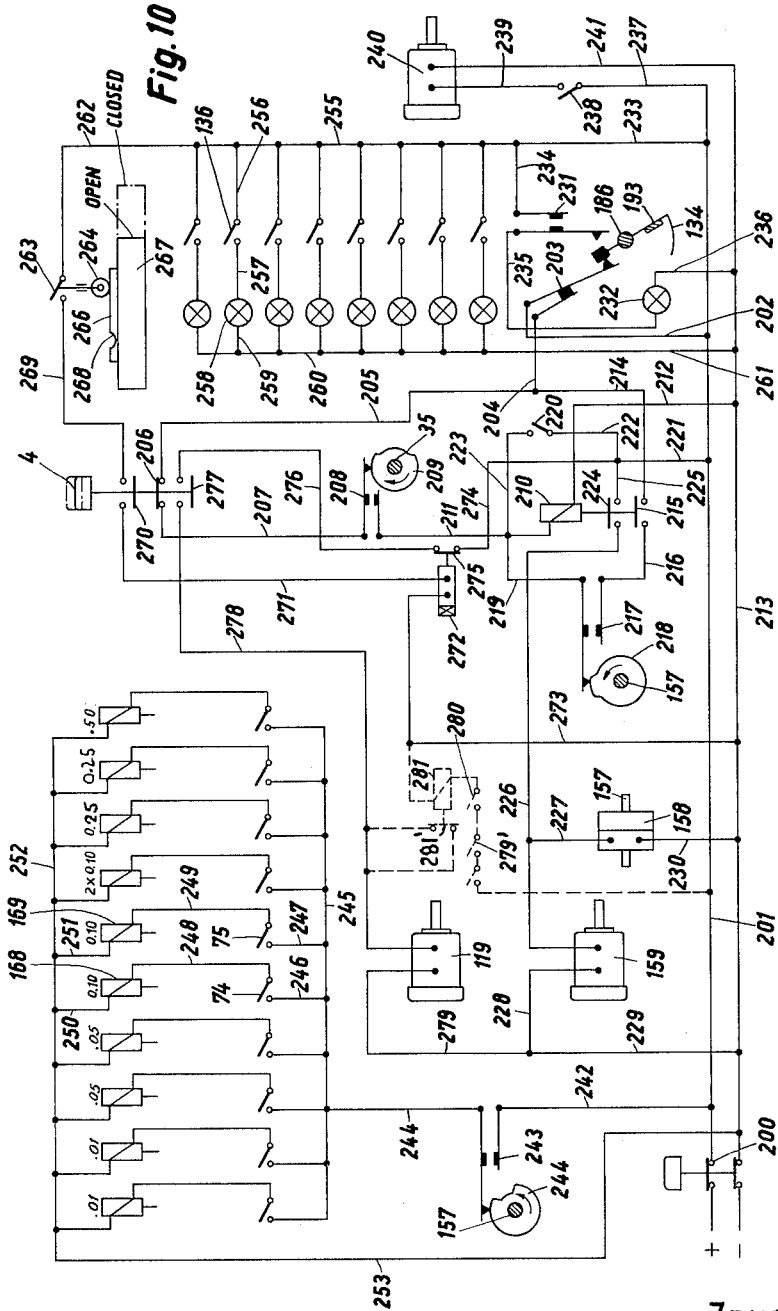

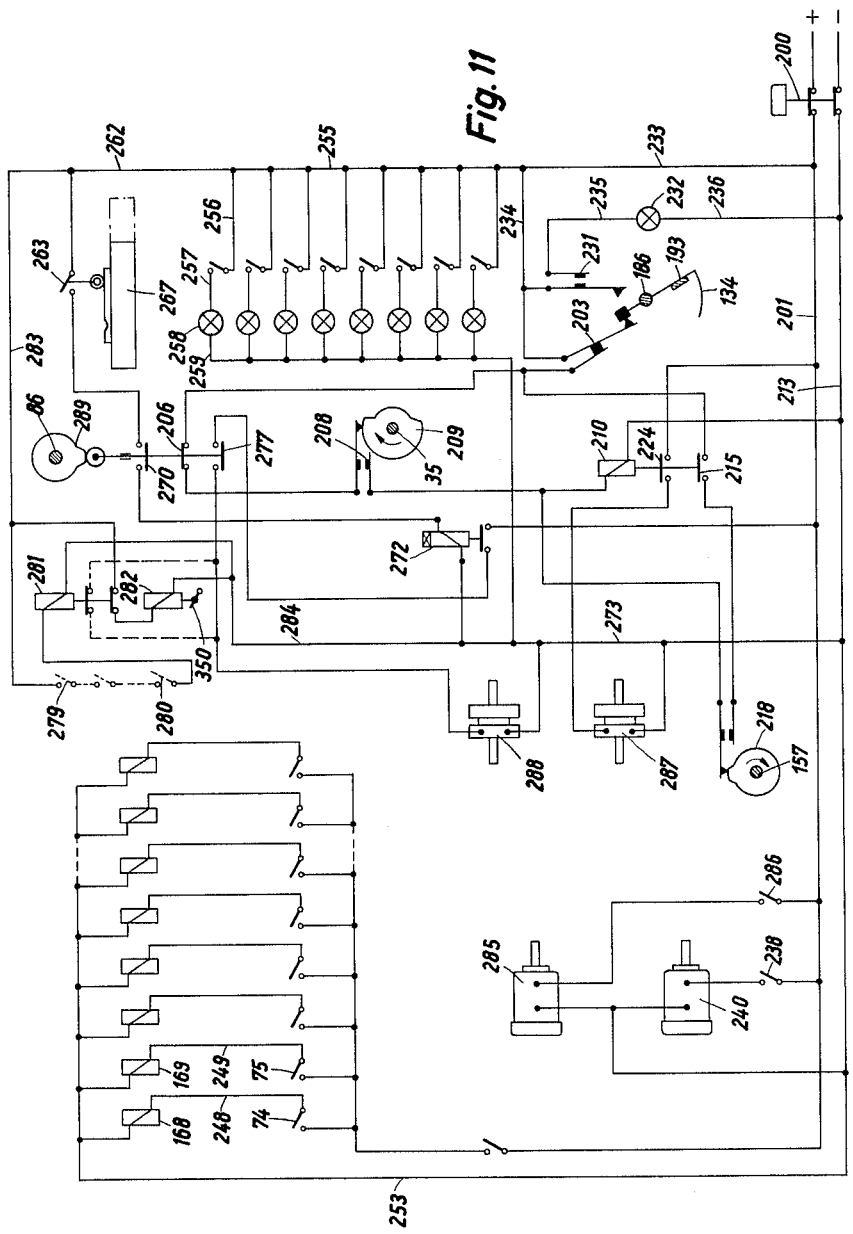

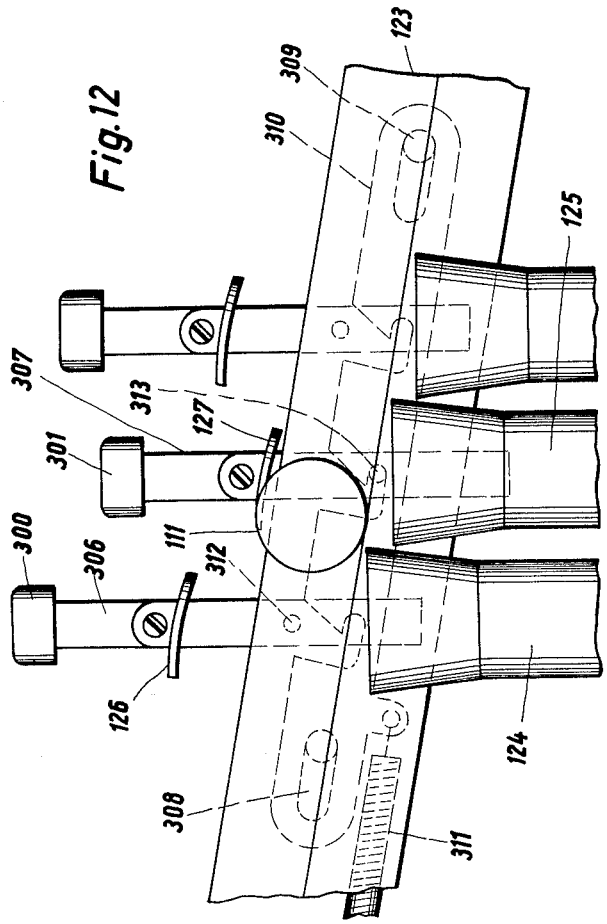

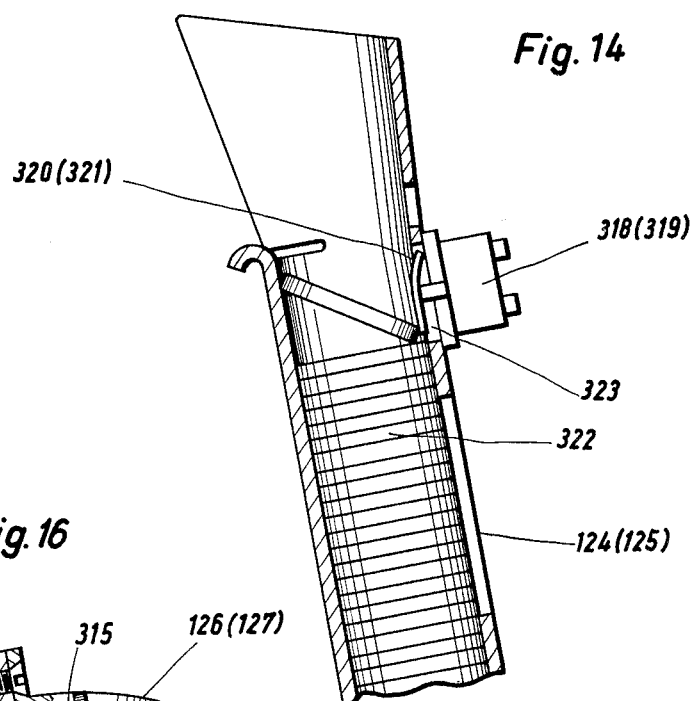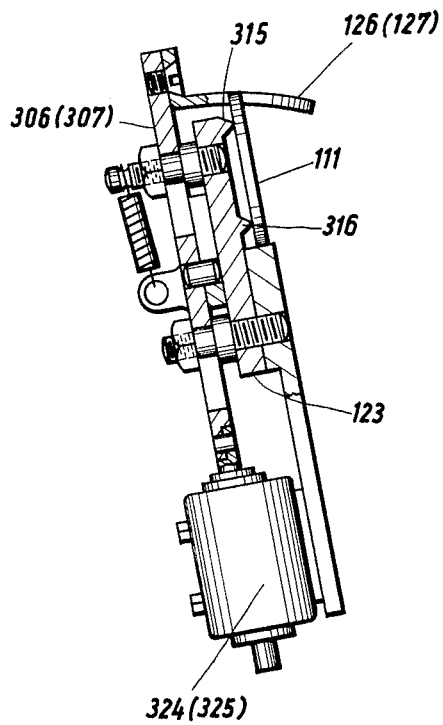

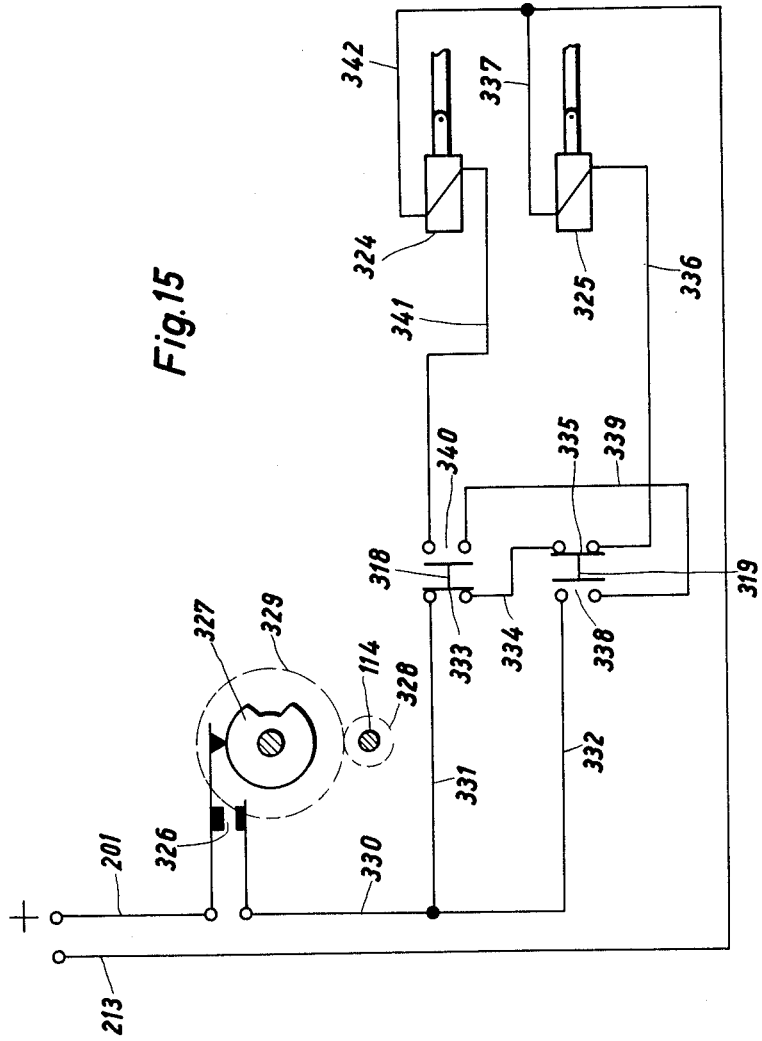

Jan. 4, 1966    A. HECKER ETAL    3,227,363
COIN SORTING APPARATUS
Filed Oct. 19, 1962    17 Sheets-Sheet 12
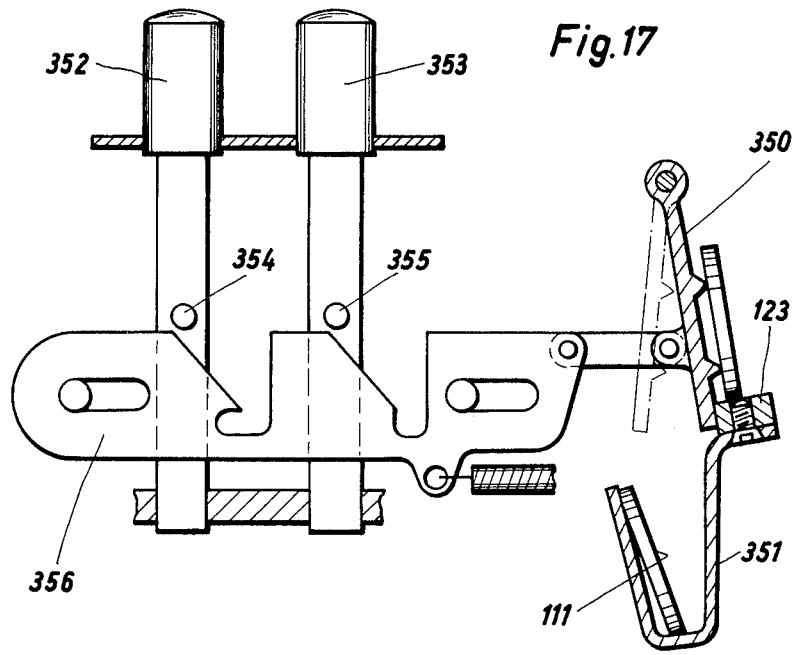
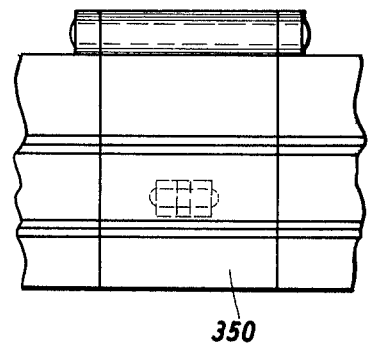
Inventors
Alfred Hecker
and
Ernst Fenner

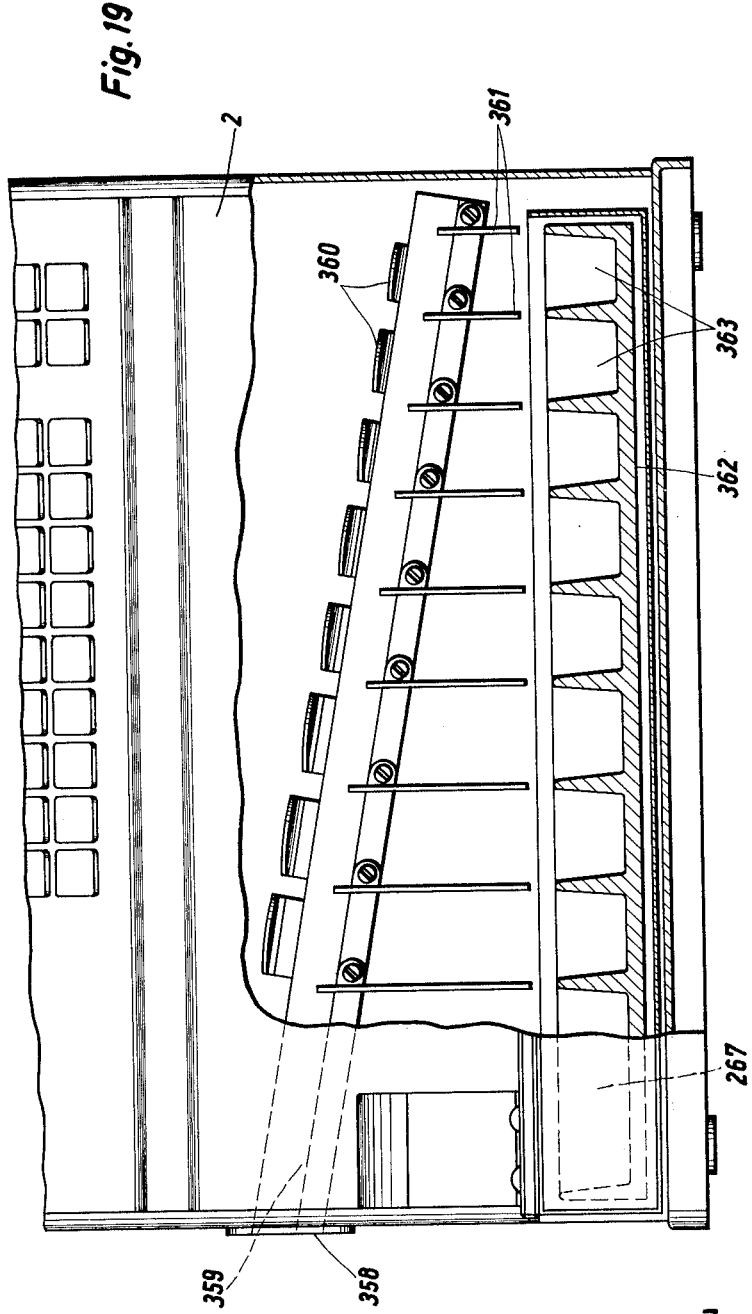

Jan. 4, 1966  A. HECKER ETAL  3,227,363
COIN SORTING APPARATUS
Filed Oct. 19, 1962  17 Sheets-Sheet 14
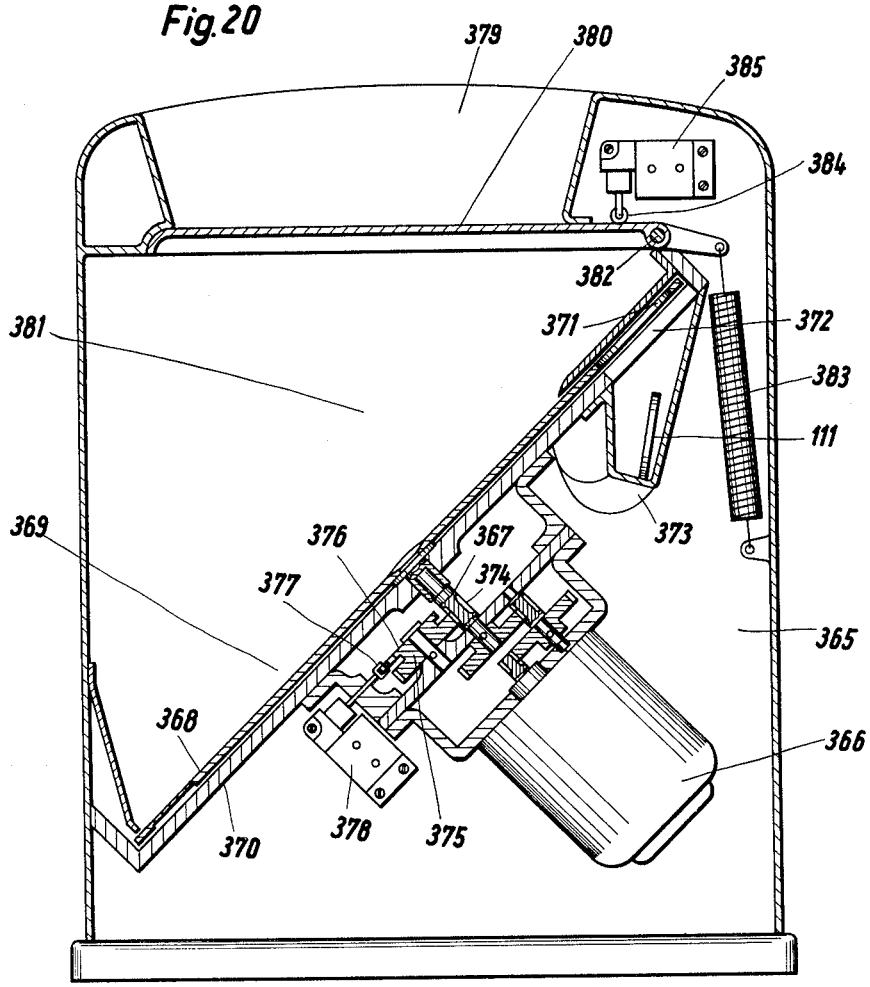
Inventors

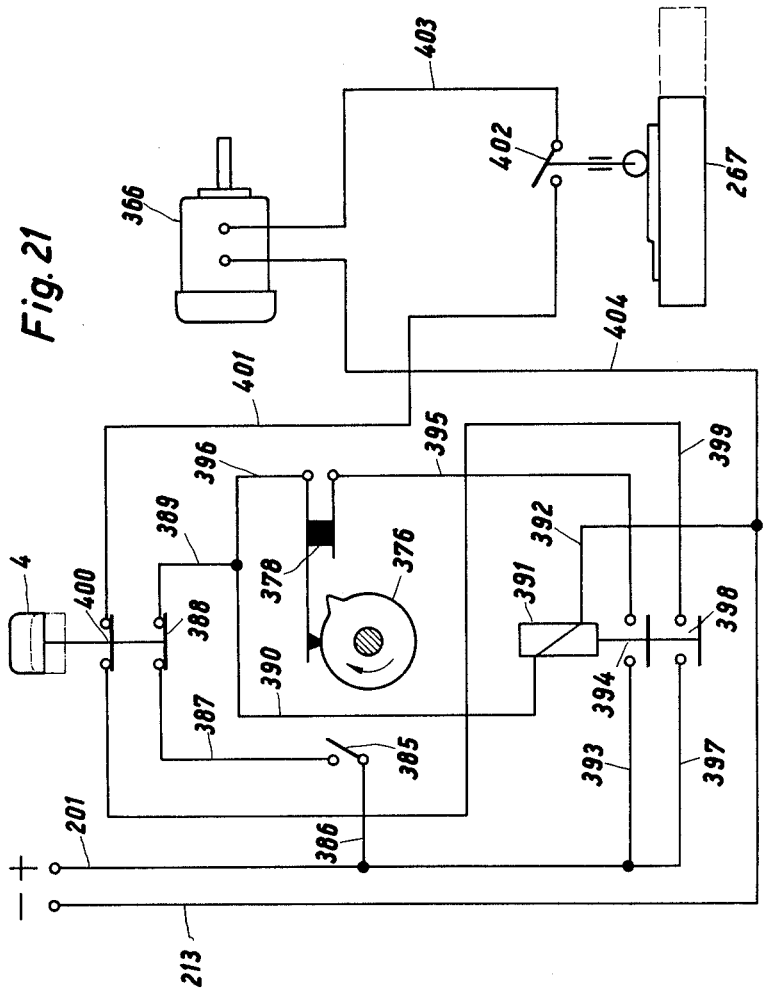

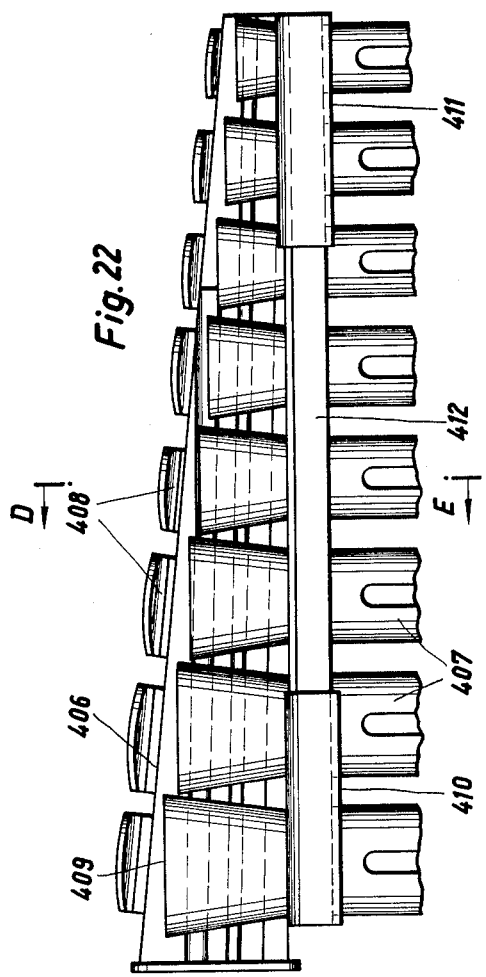
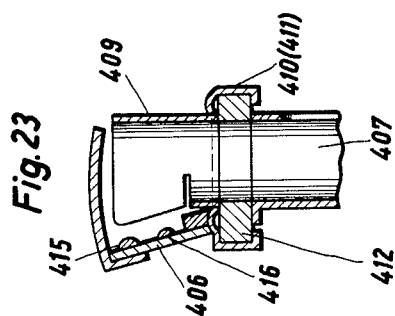

Jan. 4, 1966     A. HECKER ETAL     3,227,363
COIN SORTING APPARATUS
Filed Oct. 19, 1962     17 Sheets-Sheet 17
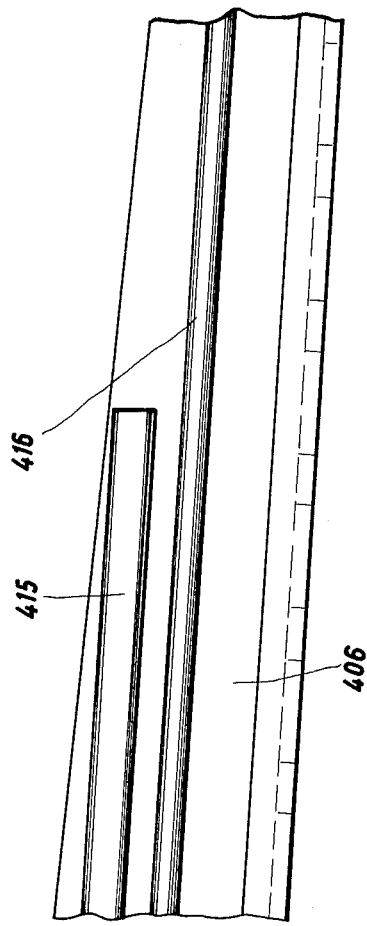
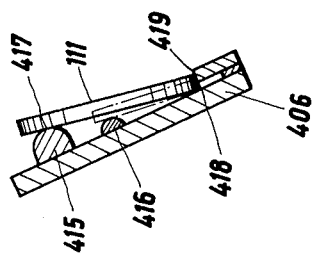
Inventors United States Patent Office 3,227,363
Patented Jan. 4, 1966

3,227,363
COIN SORTING APPARATUS
Alfred Hecker and Emil Fenrich, Bielefeld, Germany, assignors to Anker-Werke Aktiengesellschaft, Bielefeld, Germany, a German corporation
Filed Oct. 19, 1962, Ser. No. 231,752
Claims priority, application Germany, Oct. 20, 1961, A 38,617
28 Claims. (Cl. 235—7)

Our invention relates to apparatus for sorting coins in accordance with their monetary denominations, particularly for coin dispensers controlled by cash registers.

In a known automatic coin sorting apparatus, only one coin chute is provided for each coin denomination. Individual coins are issued from the chutes by manually actuated ejectors. Since, on the average, the coin quantities of different denominations being dispensed are similar, whereas for design reasons the coin storing capacity of the chutes for thicker coins, usually those of higher denominations, is smaller than that of the other chutes, the coin chutes of certain coin denominations, particularly those of higher value, must be refilled rather frequently.

Also known are coin dispensing devices in which the ejection of coins is controlled automatically in dependence upon the operation of computing mechanisms in a cash register, and such automatic dispensers have been equipped with a plurality of identical chutes for coins of one and the same denomination, but the sorting of coins into the individual chutes assigned to the same denomination must be done by hand.

It is an object of our invention to improve coin sorting devices generally of the first-mentioned, automatically sorting type by considerably increasing their storage capacity, to secure automatic replenishment of their chutes with coins, and to make them applicable for automatic coin dispensing operation under control by a cash register.

To this end, and in accordance with a feature of our invention, we provide for each of a number of coin denominations a plurality or group of chutes and equip each group of equal-denomination chutes with a control member for sequentially filling these chutes.

According to another feature of our invention, we connect the chutes with a coin guiding device leading to a coin collecting container and which receives those coins that exceed the number storable in the chutes to pass them into the container.

According to a further feature of the invention, we provide an automatic coin sorting apparatus embodying one or more of the above-mentioned features, with an automatically controlled coin dispensing device and with control means that actuate the coin sorting and dispensing operations under control by a cash register.

Another feature of our invention resides in the provision of a guide means selectively displaceable between two positions which in one position supplies the coins, placed into the coin sorting apparatus, to the chutes of the dispensing device, whereas it supplies these coins to the till of the cash register when in the other position.

According to a feature more specific than the one last mentioned, a cash register is provided with a coin guiding rail connected with the coin sorting device and having individual coin deflectors that pass the coins into respectively different compartments of the cash drawer.

According to still another feature, we design the coin sorting device as an independent unit and connect it removably with coin chutes preferably designed as an exchangeable coin-magazine assembly.

It is also within the features of our invention to give the above-mentioned coin guiding rail at the coin-contacting side such a contour that only a line contact takes place between the coins and the guiding rail.

The above-mentioned and further objects, advantages and features of our invention, said features being set forth with particularity in the claims annexed hereto, will be apparent from, and will be described in, the following with reference to the apparatus according to the invention illustrated by way of example in the accompanying drawings in which FIGS. 1 through 18 relate substantially to a first embodiment and a few modifications of components thereof, and FIGS. 19 to 25 relate essentially to details and other modifications. In detail:

FIG. 3 shows details of a feeler control appertaining to the same cash register, also in side elevation.

FIG. 5 is a front view of the same dispensing apparatus, partly in section.

FIG. 6 shows details of the coin ejector components that form part of the same dispensing apparatus.

FIG. 7 is a lateral view of a feeler control for the coin chutes.

FIG. 8 shows the feeler control devices for the coin chutes by a view in the direction of the arrow A indicated in FIG. 7.

FIG. 9 is a cross section along the line B–C according to FIG. 7.

FIG. 10 is a schematic electric circuit diagram of the coin dispensing apparatus.

FIG. 11 is another, modified circuit diagram of the coin dispensing apparatus, applicable instead of the one shown in FIG. 10.

FIG. 12 is a front view of a coin sorting rail and coin distributing device for coin chutes appertaining to the same denomination; and FIG. 13 is a part sectional side view of the same components as shown in FIG. 12.

FIG. 14 shows partly in section one of the coin chutes modified in comparison with those of FIGS. 12, 13 for automatic switching of the coin distributing device; FIG. 15 is an electric circuit diagram of the coin distributing device according to FIG. 14; and FIG. 16 shows in section a modified detail similar to FIG. 13 but relating to an electromagnetically controlled coin distributor device according to FIGS. 14 and 15.

FIG. 17 shows a coin sorting bar with a coin switching device; and FIG. 18 shows a detail of FIG. 17 seen from the right of FIG. 17.

FIG. 19 is a part-sectional front view illustrating the lower portion of a cash register with a built-in coin sorting apparatus for passing coins into compartments of the cash drawer.

FIG. 20 is a side view in section of a coin-feeder device applicable with a cash-register apparatus according to FIG. 19.

FIG. 21 is a circuit diagram relating to the coin sorting apparatus for the cash drawer according to FIGS. 19 and 20.

FIG. 22 is a front view of a coin chute magazine equipped with a sorting rail; and FIG. 23 is a cross section along the line D–E in FIG. 22.

FIG. 24 is a cross section of the sorting rail according to FIGS. 22 and 23; and FIG. 25 is a front view of the same sorting rail.

Figure 1:
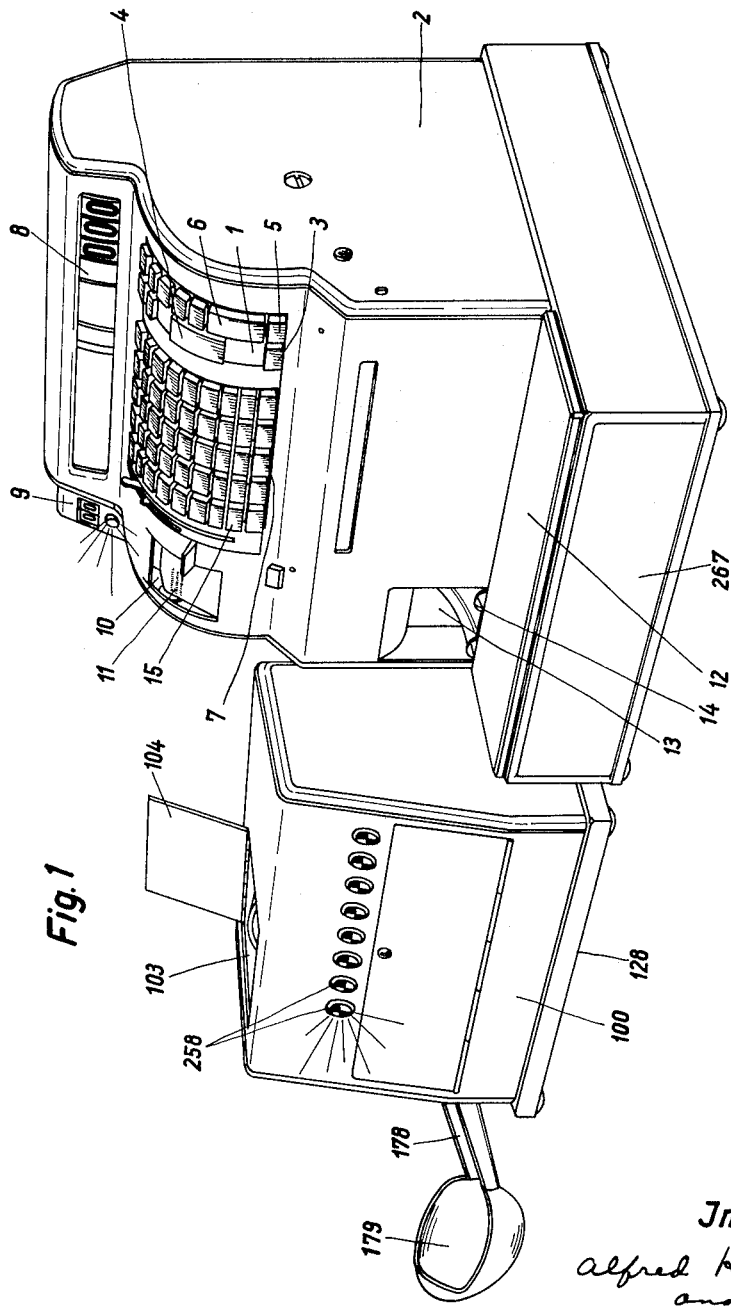
FIG. 1 is a perspective illustration of a cash register with a coin dispensing device embodying the invention.
Figure 2:
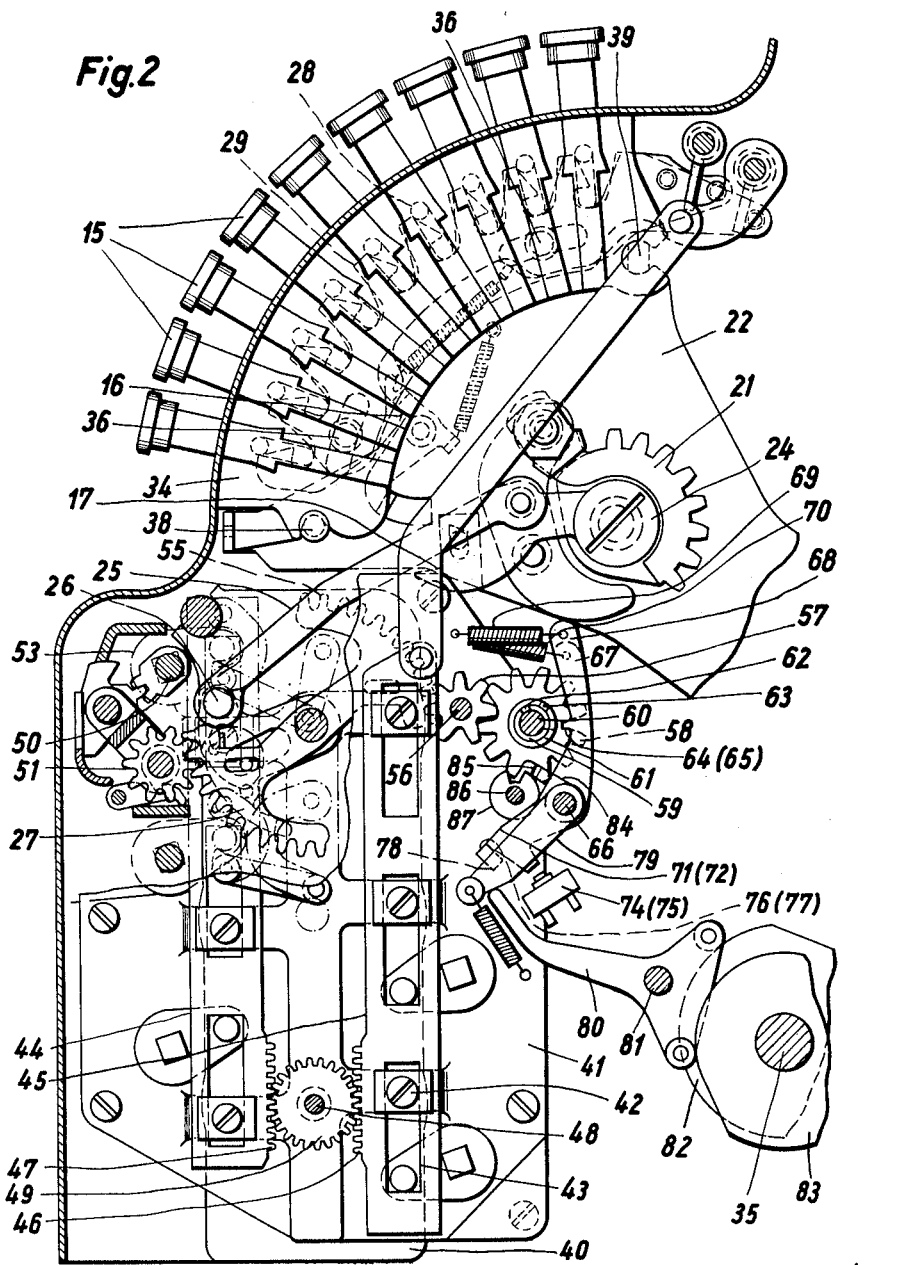
FIG. 2 is a part-sectional side elevation of the cash register shown in FIG. 1.

The keyboard 1 of the cash register 2 shown in FIG. 1 comprises a bank 3 of control keys and several banks 7 of amount-posting keys 15 (FIGS. 1, 2). The control key bank 3 comprises a "total" key 4 (FIGS. 1, 3, 10, 21) and a row 5 (FIG. 1) of adding-mechanism selector keys and another selector key 6. Located above the keyboard 1 is an indicator 8 and an item counter 9. A window 10 beside the keyboard 1 permits inspecting a record tape 11. Beneath the keyboard and immediately above a narrow table top 12 there is located a rectangular opening 13 with a guide sheet 14 through which are ejected the checks or other vouchers issuing from the machine as a result of the registering operation. The cash register is of the change-computing type. Such cash registers are known from Patent 3,049,288 and are also described in application Serial No. 86,878, filed February 3, 1961, of G. Becker, now Patent 3,066,861, both assigned to the assignee of the present invention. Reference for details may be had to these patents if desired. However, to the extent the components of the change-computing cash register are essential in conjunction with the present invention, they will be described presently.

When one of the individual keys 15 (FIG. 2) in a digital amount-posting bank 7 is being depressed, the shank 16 of the key controls a feeler member 17 of a differential mechanism 21 rotatably mounted on the frame structure 22 of the key bank by means of a pivot pin 24. Rotatably linked to the feeler 17 of the differential mechanism 21 is a linking rod 25 connected by a journal pin 26 with a gear segment 27. Each amount key 15 carries a cross pin 28 acting upon a latching slider 29 which is guided by means of a pin-and-slot connection 36 for displacement relative to the frame structure 22. Each of the individual key banks 7 possesses such a slider 29 which, when one of the amount keys in the bank is depressed, latches the key in depressed position and releases it when any other key of the same bank is actuated.

The amount keys 15, as well as the control keys of bank 3 and of the adding-mechanism selector bank 5 (FIG. 1) are held in position by means of bank brackets 34 fastened by bolts 38, 39 to the walls of the machine frame structure partially shown at 40 and 41. Mode control sliders 44 and 45 are displaceably mounted on the machine wall 41 and are guided by means of pin-and-slot connections 42, 43. The sliders 44, 45 have respective rack portions 46, 47 meshing with a pinion 49 on a mode control shaft 48. When control shaft 48 revolves, the pinion 49 conjointly displaces the mode control sliders 44 and 45 in mutually opposed directions respectively. The mode control shaft 48 is driven under control by the keys of control-key bank 3 or the adding mechanism-selector bank 5 by means of mode control cams (not shown) fastened on the machine main shaft 35 and correlated to the operating modes "addition," "subtotal" and "total."

Fastened on a control shaft 50 which is journalled in the lateral walls 40 and 41 of the machine frame structure is a computing mechanism 51 of the known type whose counting wheels can be brought into meshing engagement with the above-mentioned gear segment 27 under control by a lever 53 which in turn is controlled by the mode control slider 44. A counter segment 55 meshing with gear segment 27 drives a pinion 57 journalled on the machine wall 41 by means of a bearing pin 56. Pinion 57 meshes with a spur gear 58 firmly fastened to a tubular shaft 59 which is coaxially and rotatably mounted on a shaft 60. Assigned to each of the respective amount key banks 1 for the units-cent and tens-cent rows is a separate differential mechanism 21, a gear segment 27, a computer wheel pair of the adding mechanism 51, a counter segment 55, a gear 58 and a tubular shaft 59 or 61, in accordance with the foregoing description. The tubular shafts 59, 61 have their cylindrical surfaces provided with recesses 62, 63. These recesses can be engaged by feeler noses 64, 65 of respective feeler levers 67, 68 which are mounted beside each other on a shaft 66 and are biased by respective pull strings 69, 70 toward the tubular shafts.

The mechanism just described as well as the electric components connected therewith and described hereinafter, are in accordance with the control apparatus illustrated and described in U.S. Patent 3,061,184 assigned to the assignee of the present invention.

The feeler levers 67, 68 carry respective arms 71, 72 which control respective electric contacts 74, 75 (FIGS. 2, 11). Each arm 71, 72 (FIG. 2) has a lateral lug 76, 77 to act as an entrainer. The entrainer 76, 77 cooperates with a bridge member 78 on a spring-loaded control arm 79 and is actuable by means of a control lever 80. The lever 80 is pivoted on a pin 81 mounted on the machine frame structure and is driven by cams 82, 83 secured to the machine main shaft 35. Rigidly connected with the control arm 79 is a feeler lever 84 whose feeler tip 85 cooperates with a control member 87 (FIGS. 2, 3). The control member 87 is fastened on a shaft 86 and has a recess 88 along its periphery. The feeler tip 85 can drop into the recess 88. The shaft 86 also carries a lever 89 (FIG. 3) which is connected by a linking rod 90 with the feeler member 92 of the differential mechanism 93 appertaining to the control-key bank 3. As soon as the feeler member 92 of the differential mechanism 93, when performing a totalizing operation for computation of an amount of change, abuts against the shank 94 (FIG. 3) of the "total" key 4, the feeler tip 85 of member 84 can drop into the recess 88 and the feeler levers 67, 68 (FIG. 2) can likewise cooperate with the recesses 82, 83 of the tubular shafts 59, 61. As a result of these operations, the corresponding electric contacts 74, 75 (FIGS. 2, 11) are actuated and control the issuance of the amount of change, as will be more fully described below.

Figure 4:
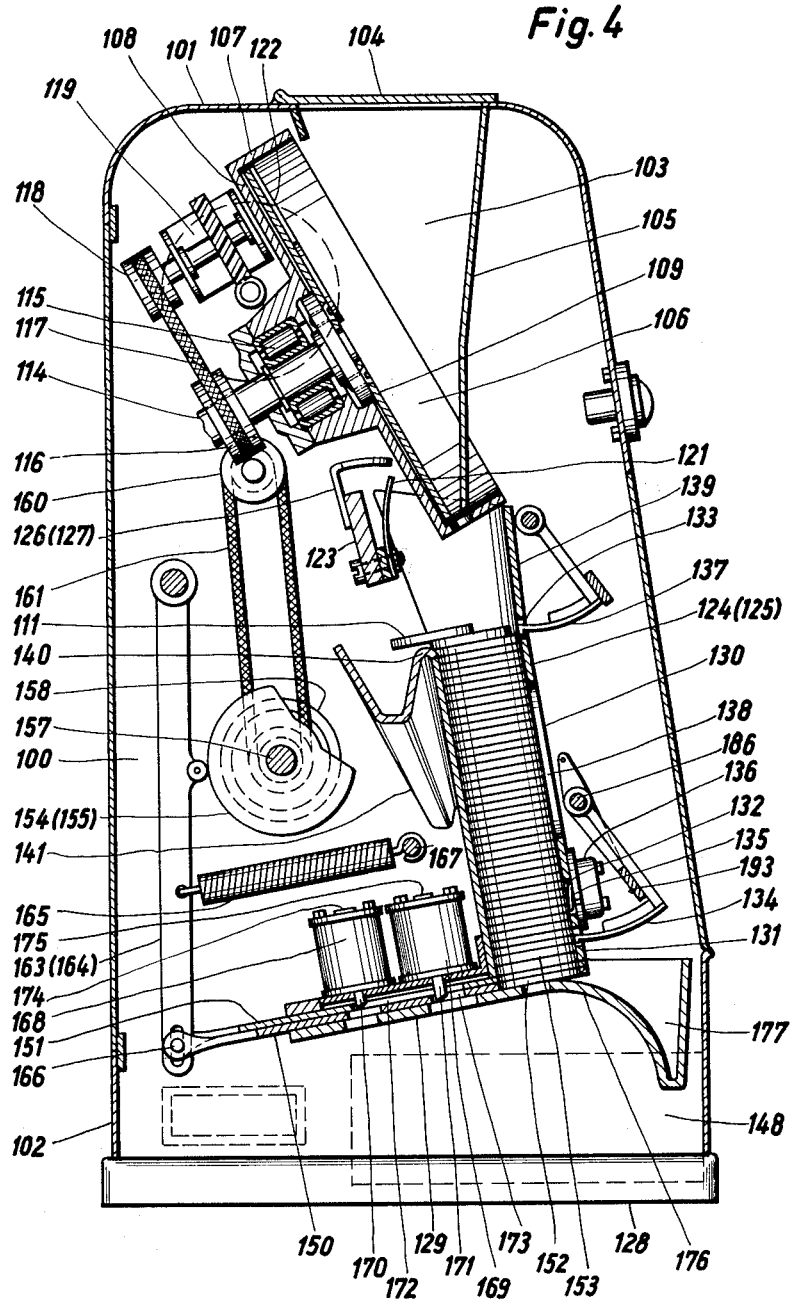
FIG. 4 is a cross-sectional side elevation of the coin dispensing apparatus according to FIG. 1.

The coin sorting and dispensing device 100, according to FIGS. 1 and 4, is controlled by the totalizer mechanism 51 of the cash register 2 and is designed as follows.

Mounted in the top portion 1 of the housing 102 is a hopper 103 provided with a lid 104. The hopper 103 (FIG. 4) has a guide wall 105 extending downwardly into the inner space 106 of a cylindrical container 107 whose bottom portion 108 is covered by a feeder disc 109 (FIGS. 4, 5). Machined into the peripheral zone of the feeder disc 109 are one or more circular openings 110 (FIG. 5) whose dimension depends upon the diameter of the largest coin 111 (for example ½ dollar). The thickness of the feeder disc 109 corresponds approximately to the thickness of that coin so that during feeding operation several smaller and thinner coins may become entrained simultaneously. A fixed guide cam 112 fastened to the housing 102 beneath the feeder disc 109 engages an annular groove 113 of the feeder disc 109 interrupted by the opening 110. The fixed cam 112 reduces in the feeding direction the air gap formed by the annular groove 113. The supporting surface thus remaining for the coin 111 is so dimensioned that only a single coin 111 can be forwarded whereas the other coins will slide out of the opening 110. The feeder disc 109 is fastened on a shaft 114 (FIG. 4) revolvable in a roller bearing 115 of the housing 107. Keyed to the shaft 114 is a belt sheave 116 which is connected by a V-belt 117 with a sheave 118 driven from a gear motor 119.

The above-mentioned opening 110 in feeder disc 109 cooperates with an elongated slot 120 (FIG. 5) in the bottom portion 108 of the cylindrical container 107 to which a guide sheet 121 is fastened. The elongated slot 120 is covered by a diaphragm 122 so that only one coin 111 at a time can be pushed through the slot 120, this coin being transported to the ejecting position through the opening 110 of feeder disc 109. Due to its gravity, the forward coin 111 rolls over the guide sheet 121 upon a sorting rail 123 which is arranged at a slight inclination above the coin chutes 124, 125 (FIG. 5).

Fastened to the sorting rail 123 at the height of the individual coin chutes 124, 125 are respective deflector segments 126, 127. These are so dimensioned that only the coins 111 corresponding to the particular coin chutes 124, 125 are seized and deflected into the chutes. The individual coin chutes 124, 125 are slightly inclined with respect to the base plate 124 of the apparatus (FIG. 4) and are fastened beside each other on a transverse support 129.

At their respective front sides 130 the chutes possess rectangular recesses 131, 132 and 133. The recess 131 is traversed by a feeler member 134 for checking the automatic dispensing of coils. Another feeler member 135 of an electric contact 136 passes through the recess 132, and a coin ejector member 137 passes through the recess 133. An elongated hole 138 permits visual inspection of the individual chutes 124, 125 to determine whether they are sufficiently filled. Each coin chute 124, 125 merges upwardly with a unilaterally open coin catching funnel 139 whose opening faces the sorting rail 123 so that the deflected coins 111 can drop into the respective chutes 124, 125. Fastened to the inner, upper edge of the coin chutes 124, 125 is a trough 141 which receives all of those coins 111 that are not stored in the individual chutes 124, 125. The proper coin guidance by the trough 141 is aided by the inclined arrangement of the chutes 124, 125 and the transverse support 129. Due to the slight friction, the surplus coins 111 glide by gravity into the trough 141.

In order to be certain that coins having roughened surfaces will pass into the trough 141, the apparatus is provided with the above-mentioned coin ejector member 137 which, during filling operation, is moved clockwise (FIG. 6) by a pull spring 142. The ejecting operation is controlled by a cam 143 on a shaft 114. The cam releases a roller lever 145 rotatably mounted on a fixed pivot pin 144 and articulately joined by a link 146 with the lever 147 of the coin ejector member 137, the lever 147 being biased by the pull spring 142. The coin trough 141 which is likewise slightly inclined as apparent from FIG. 1, is in connection with each individual coin chute 124, 125 and guides the surplus coins into a collecting container 148 (FIGS. 4, 5).

The device for ejecting the coins to automatically dispense an amount of change is designed as follows.

Each coin chute 124, 125 (FIG. 4) is open at the bottom and traversed by one or more ejectors 150, 151 depending upon the particular requirements. The ejectors 150, 151 consist of flat sliders which are displaceably mounted on the transverse support 129 and possess in their forward portions respective circular recesses 152, 153 substantially adapted to the internal diameter of the coin chute so that the lowermost coin 111 in the chute rests upon the top surface of the transverse support 129. The thickness of each ejector 150, 151 normally corresponds to that of one of the coins 111 in the stack. However, if two coins are to be simultaneously ejected from a coin chute in a single operation, then the particular ejector can also be given twice the normal thickness so that it simultaneously seizes two coins during each ejecting stroke.

Each ejector 150, 151 is controlled by a cam 154, 155 on a shaft 157 journalled in the lateral walls 156. Also mounted on the shaft 157 is a single-revolution magnetic clutch 158 driven from an electric motor 159 (FIG. 5) through a transmission 160 and an endless V-belt 161. The cams 154, 155 are engaged by respective rollers of follower levers 163, 164 which are biased by respective pull springs 165, 166 attached to a fixed pin 167. Each follower lever 163, 164 is linked to one of the respective ejectors 150, 151 by means of a pin-and-slot connection 166, 167.

The ejecting operation is controlled by electromagnets or solenoids 168, 169 whose respective cores carry latches 170, 171 engageable with openings 172, 173 of the respective ejectors 150, 151. As soon as one of the magnets 168, 169 is energized, its armature core 174, 175 pulls the latch 170, 171 upwardly (FIG. 4) so that the one correlated follower lever 163 or 164 can follow the driving motion of the cam 154 or 155. During the active stroke, the ejector pushes the coin 111 into the coin trough 177. The wall of the trough is so inclined that the coin remains upright and rolls in the trough and through a connecting channel structure 178 (FIG. 1) into a coin receiving cup 179.

For checking the coin-ejecting operations each chute 124, 125 is provided with the above-mentioned feeler member 134 (FIG. 4). This member is controlled by a cam 180 (FIG. 7). The cam is fastened on the above-mentioned cam shaft 157 and cooperates with an angular follower lever 182 rotatably mounted on a fixed pivot pin 181. An arm 183 of lever 182 is linked by a rod 184 with a lever 185 on shaft 186. The individual feeler members 134 are loosely rotatable on the shaft 186 (FIG. 8) and are prevented from axial displacement by means of shoulder rings 187, 188. The ring 187 (FIGS. 8, 9) has an entrainer claw 190 coacting with a counter claw 191 on the feeler member 134 so that when the shaft 186 turns clockwise relative to FIG. 7, the feeler member 134, under the biasing force of a pull spring 192, can follow the motion if the feeler member 134 is not stopped by a coin 111. Freely rotatable on shaft 186 is a control bracket 193 that extends over all of the feeler members 134 and is kept in engagement therewith by a relatively weak pull spring 194 (FIGS. 7, 8). As soon as any one of the feeler members 134 turns clockwise (FIG. 7) it entrains the bracket 193 in the same sense of rotation. The bracket 193 serves for controlling the circuits of the motor 159 (FIGS. 5 and 10) described presently.

The electric system connecting the cash register 2 with the coin dispensing and sorting apparatus 100 is energized from a direct-current power supply under control by a main switch 200 (FIG. 10) through a positive bus 201 and a negative bus 213. The positive bus 201 is connected through a lead 202 (FIG. 10) with a switch contact 203 controllable by the above-mentioned bracket 193 (FIGS. 4, 7, 8, 10). In the bracket position illustrated in FIGS. 4, 7 and 10, the contact 203 is closed and passes current through conductors 204, 205 to a switch contact 206 which is normally open and is controlled by the "total" key 4 of the cash register 2 caused to close when the key 4 (FIGS. 1, 3, 10) is depressed, the latter position being shown in FIG. 10. Key contact 206 is connected by a lead 207 with a switch contact 208 controlled by a cam 209 of the machine main shaft 35 (FIG. 2). Switch contact 208 is connected by a lead 211 with a control relay 210 which in turn is connected by a lead 212 with the negative bus 213.

A self-holding circuit for relay 210 extends from lead 204 through lead 214 and a normally open self-holding contact 215 of relay 210 to a lead 216 connected to a switch contact 217 which is controlled by a cam 218 fastened on the shaft 157 according to FIGS. 4 and 7. Switch contact 217 is connected by a lead 219 with the lead 211. A manually operable, normally open switch 220 has one pole connected by leads 221, 222 with the positive bus 201 and the other pole connected by lead 223 with lead 211 of relay 210. When switch 220 is manually closed it bridges the contacts 203, 206, 208 and 217. The control relay 210 has another, normally open contact 224 which is connected by leads 221, 225 with the positive bus 201 and by a lead 226 with the drive motor 159 (FIGS. 10, 5) and also through a lead 227 with an electromagnetic single-revolution clutch 158 (FIGS. 4, 10).

The circuits of the drive motor 159 and the single revolution clutch 158 are shown simplified. A time delay relay can be additionally interposed between lead 226 and clutch 158 for the purpose of delaying the starting operation of the clutch 158. The drive motor 159 is connected through leads 228, 229 with the negative bus 213, and the clutch 158 is connected with the same bus 213 through a lead 230.

As soon as one of the feeler members 134 (FIGS. 4, 7), after being released by the cam 180, drops into the interior of the corresponding coin chute 124, 125 while entraining the control bracket 193, this bracket opens the contact 203 (FIG. 10) and closes the contact 231. Contact 231 then completes the circuit of a buzzer 232 or other signal, this circuit extending from positive bus 201 through leads 233, 234, 235, 236 to the negative bus 213.

An energizing circuit for the drive motor 240 of the cash register extends from positive bus 201 through lead 237, a normally open switch 238 and a lead 239 to the motor, and thence from the motor through a lead 241 to the negative bus 238. The switch 238 is actuated by the "motorized" control keys of the control key bank 3 (FIG. 1) or by the keys of the adding mechanism selector bank 5 in the known manner.

The magnets 168, 169 according to FIG. 4 are controlled by the switch contacts 74, 75 (FIGS. 2, 10). For issuing coins in accordance with the United States coin system, a total of ten switch contacts 74, 75 are required, these contacts being mechanically controlled by the totalizing computer mechanism 51 (FIG. 2) as described in the foregoing. The particular magnets 168, 169 illustrated in FIG. 4 are correlated according to FIG. 10 to the dime chute 124. The switch contact 74 is connected with magnet 168, and the contact 75 with the magnet 169. The individual circuits of contacts 74, 75 and respective magnets 168, 169 are connected in parallel so that the current flows from the positive bus 201 through a lead 242 to a contact 243 and thence through a lead 244 to a distributor 245 through which the current passes through branches 246, 247 to the respective switch contacts 74, 75. The contact 243 is controlled by a cam 244 fastened on the control shaft 157 (FIGS. 4, 7, 10). The switch contacts 74, 75 are connected by respective leads 248, 249 with the magnets 168, 169 from which respective leads 250, 251 extend to a manifold lead 252 which in turn is connected with the negative bus 213 through a lead 253.

The above-mentioned switch contacts 136 (FIG. 4) of the coin chutes 124, 125 are likewise connected in parallel. The individual circuits extend from the positive bus 201 through a lead 233 to a distributor 255 and thence through branches 256 to the respective contacts 156. Each contact 136 has a lead 257 connected to an indicator lamp 258 (FIGS. 1, 10) which is connected by a lead 259 and further leads 260, 261 to the negative bus 213.

A control circuit for the coin dispensing device 100 (FIGS. 1, 4, 5) extends from the positive bus 201 (FIG. 10) through leads 233, 255, 262 to a switch 263 controlled by a tappet which carries a roller 264 in engagement with a rail 266 attached to the cash drawer 267 of the cash register 2 (FIG. 1). In the open and closed positions of the drawer 267, the switch 263 (FIG. 10) is open. During closing and opening travel of the drawer, the roller 264 can drop into a recess 268 of rail 266 and thus temporarily close the switch 263. Switch 263 is connected by a lead 269 with a contact 270 of the above-mentioned "total" key 4, and contact 270 is further connected by a lead 271 with an adjustable timing relay 272. The timing relay 272 can be set to differently long periods of delay with respect to its pickup response. A lead 273 connects the timing relay 272 with the negative bus 213.

An energizing circuit for the gear motor 119 (FIG. 5) of the coin dispensing device extends from positive bus 201 through leads 221, 274 and through the normally closed contact 275 of timing relay 272, thence through lead 276 through contact 277 of key 4 and lead 278 to the gear motor 119 which in turn is connected through leads 279 and 229 with the negative bus 213.

The control and energizing circuits of the coin dispensing device operate as follows.

When multiple items of a transaction are being posted and entered into the cash register, the cash drawer 267 is closed, corresponding to the dot-and-dash illustration of the drawer in FIG. 10. In this condition, the switch 263 is open. When the "total" key 4 is depressed for initiating a computation of the amount of change to be returned to the customer, such computation being effected in the manner known from the above-mentioned patents by a totalizing operation in which the computing mechanism 51 is re-set to zero, the key 4, now being depressed to the position shown in FIG. 10, opens its contact 270. Shortly, before the change-computing run of the machine is terminated, the cash drawer 267 automatically releases and moves to the open position shown by full lines in FIG. 10. Also prior to such termination of the change computing run, the "total" key 4 is released and then closes the contact 270. During subsequent closing of the cash drawer 267 by hand, the contact 263 is closed for a short interval of time, the time relay 272 responds and closes its contact 275. The contact 275 then completes for the gear motor 119 the energizing circuit 201–221–274–275–276–277–278–119–279–229–213.

This energizing circuit, which depends for operation upon the condition of contact 275 in time relay 272 and upon the position of key 4, can be interrupted at any time by actuation of key 4 which then opens the contact 277.

The described circuitry secures a reliable performance of the coin supplying device (comprising items 103, 109, 121, 123) and the coin dispensing device (comprising items 150, 151, 168, 169) because the "total" key 4 and the cash drawer 267 jointly determine the commencement and termination of the registering operations.

As shown, the gear motor 119 is optionally provided with an additional control circuit represented in FIG. 10 by broken lines for distinction from the motor energizing circuit already described. The additional control circuit comprises a normally closed contact 281' serially interposed in the connecting lead 278 of the motor energizing circuit and forming part of a relay 281 whose coil circuit extends between the positive and negative buses 201, 213 and includes in series a number of normally open feeler contacts, such as those denoted by 279' and 280. Each of the coin chutes 124, 125 is provided at its top opening with a coin feeler that actuates one of the respective contacts 279', 280. The relay 281 responds only when all of the feeler contacts 279' and 280 are closed. This takes place only when all of the coin chutes 124, 125 are fully occupied by coins 111. Relay 281 then opens its contact 281' so that the gear motor 119 cannot operate. However, as soon as any one of coin chutes 124, 125 becomes sufficiently depleted to require refilling, the relay 281 drops off and closes its contact 281', thus permitting the gear motor 119 to be energized.

While, according to FIG. 4, a coin guiding device comprising the members 137 and 141 passes surplus coins into the storage container 148, this guiding device, according to another feature of the invention, may also serve to interconnect the coin shafts 124, 125 within the group assigned to one and the same coin denomination so that coins are directly filled into the first chute of the group, whereas the connected second shaft is filled only by surplus coins from the first shaft that are supplied by means of the guiding device 137, 141.

It will be understood that with respect to mechanical design, electrical components and circuitry, an apparatus according to the invention can be modified in various other respects. One of such modifications, based upon FIG. 10, will be described presently with reference to FIG. 11.

In departure from the design of the coin dispensing device 100 shown in FIGS. 4, 5 and 10, the dispensing device can also be provided with a single electric drive motor. This motor, shown at 285 in FIG. 11, is switched on under control by a manually actuable switch 286 or automatically, for instance, under control by the "total" key 4 with the aid of an intermediate timing relay of adjustable delaying period (not illustrated in FIG. 11). In lieu of the "total" key 4, however, the modified system shown in FIG. 11 is provided with a cam 289 fastened on the shaft 86 according to FIGS. 2 and 3. The cam 289 occupies the particular position shown in FIG. 11 when the feeler member 92 (FIG. 3) of the differential mechanism 903 for control-key bank 3 (FIG. 1) has run against the shank 94 of the "total" key 4. Driving power from motor 285 is transmitted to the coin dispensing device through a single-revolution clutch 287 (FIG. 11) in the same manner as described with reference to the preceding embodiment relative to the single-revolution clutch 158. Another clutch 288 (FIG. 11), likewise driven from the motor 285, is employed in lieu of the gear motor 119 shown in FIG. 10. The clutch 288 (FIG. 11) is controlled by an adjustable timing relay 272 whose operation is dependent jointly upon actuation of the "total" key 4, upon operation of the control cam 289, and upon closing of the switch 263 associated with the cash drawer 267 as described above with reference to FIG. 10.

In other respects, the modification of FIG. 11 is similar to the system described with reference to FIG. 10 and the preceding illustrations to which further reference will be made in the following description, applicable to both embodiments of the electric system.

As apparent from FIG. 10, at least three contacts 74, 75 are required for the issuance of dimes, for example, in order to afford dispensing dimes in the total amount of 10, 20, 30 or 40 cents. For this purpose, the embodiment may be provided with two chutes 124, 125 (FIG. 4) for dime coins, one chute having two individually actuable coin ejectors 150, 151 for ejecting either one or two coins, while the other chute is provided with only one ejector for simultaneous ejection of two coins so that when all three ejectors of the two dime chutes operate conjointly, a total of 40 cents is dispensed.

In order to supply coins to chutes for one and the same coin denomination, the sorting rail 123 (FIGS. 4, 5, 12, 13) carries a number of pushbutton keys 300, 301 (FIGS. 12, 13) which are displaceable with respect to the rail by virtue of pin-and-slot connections 302, 303 and 304, 305. The shanks 306, 307 of the respective keys carry deflector segments 126, 127 (FIGS 4, 5, 12, 13). A lock slider 310 (FIGS. 12, 13) biased by a pull spring 311 arrests the one particular key 300, 301 depressed at a time. For this purpose each key carries a transverse pin 312, 313 which catches behind a latch recess of the slider 310. When another one of the keys is being depressed, the previously actuated key is released and snaps back to its starting position under the action of its return spring 314.

For reducing friction, the coin sorting rail 123 is provided with bosses or profiled projections 315, 316 (FIG. 13) so that the coins 111 are only in line engagement at their surface 317 and thus more easily roll down along the sorting rail. This has the advantage that the inclination of the sorting rail 123 can be kept at a small angle, thus permitting a considerable reduction in the over-all dimensions and height of the apparatus.

The coin switching operation just described need not be controlled by manual keys as shown at 300 and 301 in FIG. 13 but may also be effected by automatic control means such as exemplified by the modified embodiment shown in FIGS. 14, 15, 16 and described presently.

According to FIG. 14 the upper portion of each coin chute 124, 125 in a group assigned to coins of the same denomination, carries a twin-contact switch 318 or 319 (FIGS. 14, 15). The respective switch feeler members 320, 321 pass through an opening into the interior of the chute so that they are moved against the switch and close the respective twin contacts 318, 319 under the action of the coins when the chute is substantially filled. In lieu of the keys 300, 301 shown in FIGS. 12, 13, the modified devices according to FIGS. 14 to 16 are provided with magnets 324, 325 whose respective armatures are linked to the shanks 306, 307 respectively. The magnets 324, 325 are controlled by the twin contacts 318, 319 so that only one of the magnets can respond at a time. The control circuitry for the magnets is designed as follows.

The magnets 324 and 325 are energized from buses 201, 213 under control by a normally open contact 326 which is actuated by a cam 327 driven from the drive shaft 114 (FIGS. 4, 15) through a step-down gearing 328, 329. Contact 326 is connected through lead 330 with the twin contacts 318, 319 by respective leads 331 and 332. One contact member 333 of twin contact 318 connects lead 331 through a lead 334 with a contact member 335 of twin contact 319 from which a lead 336 is connected to the magnet 325. Lead 332 is connected with magnet 324 through a member 338 of twin contact 319, a lead 339, a contact member 340 of twin contact 318, and a lead 341. As soon as the twin contact 318 of coin chute 124 responds and assumes the position illustrated in FIG. 15, the magnet 325 of the other coin chute 125 for the same coin denomination is energized and pulls the corresponding shank 307 and its deflector segment 127 downwardly. After coin chute 125 is filled, its twin contact 319 responds. This interrupts the connection between twin contact 318 and magnet 325 and closes the circuit between twin contact 319 and magnet 324. However, if the stack of coins 322 in chute 124 is also filled and still holds the twin contact 318 in the position of FIG. 15, where contact member 333 is closed and contact member 340 is open, the magnet 324 cannot respond.

The performance of the apparatus as described so far will be reviewed presently with reference to the example of a registering operation.

Assume that a multiple-item transaction is to be registered by the cashier. The amounts of the individual items are first posted by means of the amount keys (FIGS. 1, 2) and are entered by actuation of an adding-mechanism selector key 6 with the result that the respective amounts of the items become registered and stored in the computing mechanism 51 (FIG. 2). After all items of the transaction are thus entered, the "subtotal" is drawn to indicate the amount to be paid by the customer, this amount being then exhibited at the indicator 8 (FIG. 1). If this amount is tendered to the cashier in form of coins, the cashier may fill these coins directly into the funnel 103 of the coin sorting and dispensing apparatus 100. Assume, however, that the customer has tendered an amount higher than the one due. For determining the amount of change, i.e. the difference between the amount tendered and the amount determined by the subtotal drawn, the cashier initiates a totalizing machine run by actuating the "total" key 4.

During totalizing operation of the cash register the energizing circuit for the gear motor 119 of the apparatus 100, extending through components 201–221–274–275 to 279–119–229–213 (FIG. 10), is interrupted at contact 277 of the "total" key 4 so that the drive for the coin supply device, comprising the components 103, 109, 121 and 123 (FIGS. 4, 5) is stopped. Also during the totalizing run of the cash register, the computing mechanism 51 is reset to zero, the computed amount is shown by the indicator 8 and printed upon the recording tape 11 as well as upon the check or voucher (not shown) to be issued to the customer. Simultaneously, the contacts 74, 75 (FIG. 2) are switched by the feeler levers 67, 68 coacting with the tubular shafts 69, 61; and the control relay 210 is energized because its coil circuit 201–202–203–204–205–206–207–208–211–210–212–123 is now completed by the closing of contact 208 under the action of the cam 209 (FIG. 10) fastened on the machine main shaft 35. The contact 224 of relay 210 now closes the energizing circuits 201–221–226–227–230–213 and 201–221–226–228–229–213 of the single-revolution clutch 158 and of the drive motor 159. When the shaft 157, driven by clutch 158, starts moving (FIGS. 2, 10) the cam 244 on shaft 157 closes its contact 243. This completes the control circuits for the coin ejector magnets 168, 169 through components 201–242–244–245–246 and 247–74 and 75–248 and 249–168 and 169–250 and 251–252–253–213. The magnets 168, 169 now actuate the respective ejectors 150, 151 which issue from the chutes 124, 125 the individual coins 111 that make up the amount of change. The coins drop into the coin trough 177 which guides them to the cup 179 (FIG. 1) from which they can be taken by the customer.

Shortly prior to termination of the machine run, the cash drawer 267 opens and key 4 is released and returns to the normal position shown by dot-and-dash lines in FIG. 10 in which contact 206 is open and contacts 270, 277 are closed. The control relay 210, however, remains picked up because its self-holding circuit is closed at contact 217 under control by cam 218 on shaft 157 as follows: 201 to 204–214–215–216–217–219–210–212–213. That is, the cam-controlled contact 217 bridges the now open contact 206 of key 4. The cams 209, 218 and 244 are so adapted to one another that the coin ejecting operation, once initiated, is completed as long as the feeler member 134 does not open its contact 203. In the latter case, an additional control circuit 201–221–222–220–223–210–212–213 can be closed by hand with the aid of switch 220.

When thereafter the cashier closes the cash drawer 267 (FIGS. 1, 10) the adjustable timing relay 272 is energized by the closing of the drawer-actuated switch 263 which completes for the relay the coil circuit: 201–233–255–262–263–269–270–271–272–273–213. The contact 275 of the timing relay 272, upon lapse of the timing period, closes for gear motor 119 the energizing circuit 201–221–274–276–277–278–119–279–229–213. The gear motor 119 turns the feeder disc 109 (FIGS. 4, 5) which individually seizes the coins 111 stored in the hopper 103 and successively passes them along the guiding sheet 121 to the sorting rail 123 whose deflector segments 126, 127 guide the coins 111 into the corresponding coin chutes 124, 125. As soon as the "total" key 4 is again actuated, its contact 277 opens the above-described energizing circuit of gear motor 119.

If desired, the just-mentioned energizing circuit for gear motor 119 can also be controlled in dependence upon the position of the cash drawer 267 by providing the drawer with another control rail similar to the one shown in FIG. 21 and so designed that when the drawer 267 is closed the appertaining contact is also closed while when the drawer 267 is open the contact is also open. This additional switch contact can be interposed serially between lead 276 (FIG. 10) and contact 277 of key 4. After closing of the cash drawer 267 or release of key 4, voltage is again applied to the gear motor 119 for such time as will elapse till the timing relay 272 opens its contact 275 or the key 4 again interrupts the energizing circuit of motor 119 at contact 277.

The control of contacts 206, 270, 277 by control cam 289 as shown in FIG. 11 is particularly suitable for change computing cash registers 2 which are provided with a "universal" key that releases the machine runs required for drawing a subtotal, entering the amount tendered, and computing the amount of change. Such a cash register is known from the above-mentioned Patent 3,066,861 (Serial No. 86,878, filed February 3, 1961) where the universal control key is denoted by 7.

In order to permit using the coin sorting device also under conditions where all coin chutes 124, 125 are filled up to a certain degree, a flap 350 (FIGS. 17, 18) is built into the coin sorting rail 123 (FIG. 5) ahead of the first coin chute 124. When the flap 350 is in the open position shown by dot-and-dash lines in FIG. 17, the coins 111 rolling down the guide cam 121 (FIG. 5) drop into the guiding trough 351 (FIG. 17) beneath the flap 350 and thus do not pass into any chute but roll either into a collecting container as shown at 148 in FIG. 5 or into the cash drawer, preferably as shown in FIG. 19 and described below. The flap 350 can be selectively set to open or closed position by hand with the aid of keys 352, 353 (FIG. 17). The keys 352, 353 are provided with transverse pins 354, 355 respectively for cooperation with a spring-loaded control slider 356. The slide is so shaped that the key 352 serves for opening the flap 350 whereas the key 353 serves only for releasing the key 352 and for thereby resetting the flap to the closed, full-line position shown in FIG. 17.

However, the flap 350 may also be opened automatically by means of an electromagnet 282 (FIG. 11) controlled by a relay 281. The coil circuit of relay 281 contains a number of series connected feeler contacts 279, 280 which check the filling degree of the respective coin chutes 124, 125. When all of the feeler contacts 279, 280 are closed, the relay 281 is energized and then also energizes the flap-control magnet 282 in the circuit 201–233–255–262–283–282–284–273–213.

The coin guiding trough 351 (FIG. 17) is fastened to a flange 358 of a sorting rail 359 (FIG. 19) mounted within the cash register 2 above the cash drawer 267. Fastened by means of screws to the sorting rail 359 are a number of deflector segments 360 and a number of guiding sheets 361. The coin container 362 in the drawer 262 is subdivided into individual compartments 363 corresponding to the sorted coins. The pre-sorting operation minimizes the work and attention required of the casher in the event of electric current failure, trouble in the coin ejecting devices or troubled computing operation.

If desired, coin feeder device 365 according to FIG. 20, designed as an optional attachment, can be directly fastened to the flange 358 (FIG. 19) of the sorting rail 359.

The coin feeder device 365 according to FIG. 20 comprises a gear motor 366 whose output shaft 367 carries a feeder disc 368 rotating at the bottom space 369 of a cylindrical container 317. The feeder disc 368 is designed exactly in the same manner as the feeder disc 109 according to FIG. 5. It possesses one or more openings 371 for coin entrainment. These openings cooperate with an opening 372 of container 370. The coins that pass through the opening 372 drop into a coin guiding trough 373 which communicates with the sorting rail 359 of a cash register. The output shaft 367 of the gear motor carries a pinion 374 in mesh with a spur gear 375 journalled on the container 370. Coaxially joined with spur gear 375 is a cam 376 which controls the actuator 377 of a switch 378. Mounted between a coin hopper 379 and the coin storage space 381 is a lid 380 which is hinged at 382 to the housing 317 of the apparatus and is held in the illustrated closing position by a pull string 383. An actuator 384 of another switch 385 rests from above against the lid 380.

The control circuit of motor 366 is shown in FIG. 321. The above-mentioned positive bus 201 is connected by a branch lead 386 through the above-mentioned switch 385 and a lead 387 with a normally closed contact 388 controlled by the "total" key 4. The key contact 388 is connected through leads 389, 390 with a contactor 391 which in turn is connected by a lead 392 with the negative bus 213. A self-holding circuit for contactor 391 extends from bus 201 through lead 393 and the normally open self-holding contact 394 of contactor 391, thence through the contacts 378 actuable by the above-mentioned cam 376 (FIG. 20). From contact 376 the self-holding circuit extends through lead 396 to lead 390.

The gear motor 366 (FIGS. 20, 21) is energized in a circuit which extends from positive bus 201 through a lead 397 and a normally open contact 398 of contactor 391 and further through lead 399 and a normally closed contact 400 of "total" key 4 and a lead 401 connected to the switch 402 of the cash drawer 267. A lead 403 connects switch 402 with one terminal of motor 366. The other terminal is connected through a lead 404 with bus 213.

As mentioned, when the amount of change is being determined by a totalizing machine run of the cash register 2, the drawer 267 is automatically opened and the "total" key 4 is released and resumes the full-time position shown in FIG. 21. As soon as the cashier places coins upon the lid 380 (FIG. 20), it turns downward and the switch 385 (FIG. 21) is closed. The contactor 391, energized through switch 385 and key contact 388, now closes its self-holding circuit: 201–393–394–395–378–396–390–391–392–213. The cam 376 has such a cam contour that it can interrupt the holding circuit only for a short interval of time. Due to the response of the contactor 391, the energizing circuit for the drive motor 366 is prepared from bus 201 through components 397, 398, 399, 400, 401 up to the still open switch 402. When thereafter the cash drawer 267 is closed by the cashier, the energizing circuit is completed by closing of the switch 402. Now the motor 366 is energized.

As soon as the key 4 is thereafter depressed or the cash drawer 267 opened, the energizing circuit of the drive motor 366 is again interrupted so that no coins 111 are conveyed out of the coin storage space 381 (FIG. 20).

The coin feeder device 365 described above with reference to FIGS. 20 and 21 can further be coupled with a coin sorting rail 406 as shown in FIGS. 22 and 23 to form a complete coin sorting apparatus. The sorting rail 406 according to FIGS. 22 and 23 is also provided with the devices for controlling the filling of coins of the same denomination into the proper coin chutes de-described above in conjunction with FIGS. 12, 13.

Furthermore, the coin sorting rail 406 carries coin deflectors 408, funnel-shaped coin catcher sheets 409 for the respective coin chutes 407 as well as sheet members 410, 411 for guiding a bridge member that interconnects the chutes 407. This device is suitable for exchangeable coin magazines of the general type employed with known coin dispensers that operate under control by change computing cash registers. However, the device can also be directly placed upon the conventional coin dispensers.

The above-mentioned sorting rail 123 (FIGS. 5, 12, 13, 16) is preferably improved in accordance with the features illustrated in FIGS. 23, 24, 25 and described presently. The coin sorting rail denoted by 406 in FIGS. 22 to 25 has elongated projections 415, 416 that correspond to those described above with reference to the protuberances 315 and 316 shown in FIG. 13. The projections 415, 416 consist of ground and polished profile rods of substantially semicircular cross section. These rods take care that the coins 111 touch the sorting rail only at their inner surface 417 and edges 418, 419 so that the individual coins will readily roll down on the rail even if the inclination of the sorting rail 406 is only slight. The thickness of the respective rods 415, 416, suitably welded or otherwise joined with the main body of the sorting rail 406, is graduated so that each coin 111 touches only one of the respective rods 415, 416 to secure a minimum amount of friction.

To those skilled in the art it will be obvious upon a study of this disclosure that our invention permits of a variety of modifications with respect to mechanical and electrical components, their arrangement and circuitry and hence can be given embodiments other than particularly illustrated and described herein. without departing from the essence of our invention and within the scope of the claims annexed hereto.

We claim:

1. Coin sorting apparatus, comprising coin stacking chutes for respectively different denominations and having for each of a plurality of said denominations a group of identical-denomination chutes, coin guide means for directing coins of respectively different denominations into respective ones of said coin stacking chutes, said guide means being provided with respective distributor devices for passing coins of the same denomination into a plurality of chutes of said group, and dispensing means for issuing coins from said chutes.

2. Coin sorting and dispensing apparatus, comprising coin stacking chutes for respectively different denominations and having for each of a plurality of said denominations a group of identical-denomination chutes, coin guide means for directing coins of respectively different denominations into respective ones of said coin stacking chutes, said guide means being provided with respective distributor devices for passing coins of the same denomination into a plurality of chutes of said group, and dispensing means for automatically issuing coins from said chutes, a coin feeder mechanism for supplying coins to the respective chutes of the group, said coin guide means extending from said feeder mechanism along the top openings of all of said chutes and having discriminating distributor means for passing coins of respective proper denominations to said chutes, and control means operating in dependence upon said distributor means to control said feeder mechanism for sequentially filling the chutes of each group from said coin guide means.

3. Coin sorting and dispensing apparatus, comprising coin stacking chutes for respectively different denominations and having for each of a plurality of said denominations a group of identical-denomination chutes, coin guide means for directing coins of respectively different denominations into respective ones of said coin stacking chutes, said guide means being provided with respective distributor devices for passing coins of the same denomination into a plurality of chutes of said group, and dispensing means for automatically issuing coins from said chutes, a coin feeder mechanism for supplying coins to the respective chutes of the group, said coin guide means extending from said feeder mechanism along the top openings of all of said chutes and having discriminating distributor means for passing coins of respective proper denominations to said chutes, and control means operating in dependence upon said distributor means to control said feeder mechanism for sequentially filling the chutes of each group from said coin guide means, said control means comprising selectively actuable manual means for determining the filling sequence of the chutes in a group.

4. Coin sorting and dispensing apparatus, comprising coin stacking chutes for respectively different denominations and having for each of a plurality of said denominations a group of identical-denomination chutes, coin guide means for directing coins of respectively different denominations into respective ones of said coin stacking chutes, said guide means being provided with respective distributor devices for passing coins of the same denomination into a plurality of chutes of said group, and dispensing means for automatically issuing coins from said chutes, a coin feeder mechanism for supplying coins to the respective chutes of the group, said coin guide means extending from said feeder mechanism along all of said chutes and having discriminating distributor means for passing coins of respective proper denominations to said chutes, each of said groups having sensing means responsive to the filling degree of the chutes, and each of said groups having control means for controlling the sequence in which said feeder mechanism supplies the chutes of the group with coins from said coin guide means, said control means being connected to said sensing means to operate in response to the filling degree of the chutes.

5. Coin sorting and dispensing apparatus, comprising coin stacking chutes defining coin-stack spaces for respectively different denominations and having for each of a plurality of said denominations a group of identical-denomination chutes, coin guide means for directing coins of respectively different denominations into respective ones of said coin stacking chutes, said guide means being provided with respective distributor devices for passing coins of the same denomination into a plurality of chutes of said group, and dispensing means for automatically issuing coins from said chutes, a coin feeder device having discriminating distributing means for passing coins of respective proper denominations to said groups, control means for each of said chute groups for controlling said feeder device to fill said chutes of each group in a predetermined sequence, a collecting container, and a coin guiding device extending from said chutes to said container for constrainedly passing surplus coins not storable in said chutes to said container.

6. In coin sorting and dispensing apparatus according to claim 5, said coin guiding device having a channel structure extending past all of said chutes in an inclined position adapted to permit said surplus coins to be gravity-conveyed into said channel structure.

7. In coin sorting and dispensing apparatus according to claim 5, said coin chutes being provided with respective ejector means mounted near the top of the coin-stack space of the chute and engageable with surplus coins for ejecting them into said guiding device.

8. Coin sorting and dispensing apparatus, comprising coin stacking chutes for respectively different denominations and having for each of a plurality of said denominations a group of identical-denomination chutes, a coin feeder mechanism for supplying coins to the respective chutes of the group, a coin guide device having discriminating distributor means for passing coins of respectively different denominations from said feeder mechanism to said chutes and having control means for each of said groups for controlling the filling sequence of the chutes in said group, coin dispensing mechanisms connected with said respective chutes, and cash-register controllable means connected with said coin feeder and coin dispensing mechanisms for controlling them in dependence upon registering operations of a cash register.

9. With a cash register having a cash drawer, the combination of a coin sorting apparatus comprising coin stacking chutes for respectively different denominations and having for each of a number of said denominations a group of identical-denomination chutes, dispensing means for issuing coins from said chutes, a coin feeder device having discriminating means for passing coins of respective proper denominations to said groups, control means for each of said chute groups for controlling the filling sequence of the chutes in said group, and a coin guide structure selectively adjustable between two positions, said guide structure connecting in one of said positions said feeder device with said coin chutes and connecting in the other position said feeder device with said cash drawer.

10. Coin sorting apparatus according to claim 9, comprising manual setting means (352, 353) for selectively adjusting said coin guide structure (350) to pass coins to said chutes and to said cash drawer respectively.

11. Coin sorting apparatus according to claim 9, comprising electromagnetic control means connected to said coin guide structure for selectively adjusting it to pass coins to said chutes and to said cash drawer respectively, and condition-responsive circuit means connected to said electromagnetic control means for automatically actuating the latter.

12. With a cash register having a cash drawer, the combination of a coin sorting apparatus comprising coin stacking chutes for respectively different denominations and having for each of a number of said denominations a group of identical-denomination chutes, dispensing means for issuing coins from said chutes, a coin feeder device having discriminating means for passing coins of respective proper denominations to said groups, control means for each of said chute groups for controlling the filling sequence of the chutes in said group, and a coin guide structure selectively adjustable between two positions, said guide structure connecting in one of said positions said feeder device with said coin chutes and connecting in the other position said feeder device with said cash drawer, electromagnetic control means connected to said coin guide structure for selectively adjusting it to pass coins to said chutes and to said cash drawer respectively, and condition-responsive circuit means connected to said electromagnetic control means for automatically actuating the latter, said condition-responsive circuit means comprising respective sensing means responsive to the filling degree of said chutes, and said cash register having a totalizer control key and a circuit controlled by said key and forming part of said circuit means, whereby said coin guide structure is positionally controlled in dependence upon said chute filling degree as well as upon occurrence of totalizing operation in the cash register.

13. In apparatus according to claim 9, said coin guide structure comprising a guide rail having two aligned portions longitudinally separated from each other and a hinged flap member adjustable to said two positions, said flap member being closed when in one of said positions and then forming a continuous guide rail assembly together with said two portions, and said flap member being open when in the other position to then permit coins to drop off said guide rail assembly.

14. In combination with a cash register capable of various types of machine run operations, a coin sorting apparatus comprising a coin hopper and an electrically driven coin feeding device for feeding individual coins from said coin hopper, coin stacking chutes for respectively different coin denominations, dispensing means for issuing coins from said chutes, said coin feeder device having discriminating means for passing coins of different denominations into said respective chutes, said cash register having manual control switch means and automatic control switch means and electric control circuits connecting said manual and automatic switch means with said feeding device for switching said sorting apparatus on and off in dependence upon a particular machine run operation of said cash register.

15. With a cash register having a cash drawer, the combination of a coin sorting apparatus comprising a coin receiving chamber, coin feeder means for individually issuing coins from said chamber, said cash register having a cash drawer with compartments for coins of respectively different denominations, a gear motor for operating said coin sorting apparatus, a relay for controlling said gear motor, and a total key for releasing said cash drawer into open position, said motor being under control of said relay to prevent operation of said sorting apparatus when said total key is being actuated or when said cash drawer is in said open position, coin guide structure extending from said feeder means over said compartments and having discriminating deflector means for passing coins of the respective proper denominations into said compartments.

16. With a cash register having a cash drawer, the combination of a coin sorting apparatus, comprising coin stacking chutes for respectively different coin denominations, dispensing means near the chute bottoms for dispensing coins therefrom, said cash register having a gear motor for operating said coin sorting apparatus, and a total key for releasing said cash drawer into open position, and automatic control switch means and electric control circuits connecting said total key and said switch means with said gear motor to prevent operation of said sorting apparatus when said total key is being actuated and when said drawer is in said open position, a coin receiving container and coin feeder means for issuing individual coins from said container, coin guide means extending over said chutes and having respective discriminating deflector means for passing coins of respective proper denominations into said chutes, said container and feed means and guide means with said deflector means forming jointly an independently operable sorting unit, and said chutes being joined together and forming jointly a magazine unit releasably attachable to said sorting unit.

17. With a cash register in combination, a coin sorting apparatus comprising a coin hopper, coin stacking chutes for respectively different coin denominations, a coin sorting rail arranged at a slight inclination above said coin stacking chutes, an electrically driven feeder device associated with said coin hopper and including a rotatable disc for feeding coins individually and sequentially from said hopper to said sorting rail, dispensing means for issuing coins from said chutes, said coin feeder device having discriminating means for passing coins of different denominations into said respective chutes, said feeder device having an electric drive motor and a control circuit for said motor, said circuit having pulse-responsive means for switching said motor to start and stop said sorting apparatus, said cash register having a manually actuable member for initiating a change computing totalizing machine run operation and having a member automatically movable in response to termination of said operation, said two members having respective electric contact means connected with said pulse-responsive means for controlling the latter.

18. In apparatus according to claim 17, said cash register comprising a totalizer key constituting said manually actuable member and having a contact for issuing a motor-starting pulse to said control means.

19. In apparatus according to claim 17, said cash register comprising a cash drawer which opens at the completion of a totalizing operation, said drawer constituting said automatically movable member and having a contact actuable by movement of said drawer from open to closed position for issuing a starting pulse to said control means.

20. With a cash register in combination, a coin sorting apparatus comprising a coin hopper, coin stacking chutes for respectively different coin denominations, a coin sorting rail arranged at a slight inclination above said coin stacking chutes, an electrically driven feeder device associated with said coin hopper and including a rotatable disc for feeding coins individually and sequentially from said hopper to said sorting rail, dispensing means for issuing coins from said chutes, said coin feeder device having discriminating means for passing coins of different denominations into said respective chutes, said cash register comprising two control members of which one is dependent upon the operation of the other, and electric circuit means connecting said two control members with said sorting apparatus for controlling the dispensing of the coins and the filling of the coin chutes in response to actuation of both said control members.

21. With a cash register in combination, a coin sorting apparatus comprising a coin hopper, coin stacking chutes for respectively different coin denominations, a coin sorting rail arranged at a slight inclination above said coin stacking chutes, an electrically driven feeder device associated with said coin hopper and including a rotatable disc for feeding coins individually and sequentially from said hopper to said sorting rail, dispensing means for issuing coins from said chutes, said coin feeder device having discriminating means for passing coins of different denominations into said respective chutes, said cash register and said coin dispensing means and said coin feeder device having respective electric components, said sorting device having an electric motor for driving said feeder device, and electric circuit means including a timing relay circuit and a motor energizing circuit for controlling said motor, said circuit means jointly comprising said components to be controlled in dependence upon coincident operation thereof, said cash register being provided with a totalizer key having a plurality of contact members actuated thereby, one of said contact members being connected for actuating said coin dispensing means independently of said two electric components being in said coincident operation with each other.

22. With a cash register in combination, a coin sorting apparatus comprising coin stacking chutes for respectively different coin denominations, dispensing means for issuing coins from said chutes, a coin feeder device having discriminating means for passing coins of different denominations into said respective chutes, said cash register and said coin dispensing means and said coin feeder device having respective electric components, said sorting device having an electric motor for driving said feeder device, and electric circuit means for controlling said motor, said circuit means jointly comprising said components to be controlled in dependence upon coincident operation thereof, said circuit means for controlling said motor of said feeder device comprising an energizing circuit and a contactor in said circuit, said chutes having respective feeder contacts responsive to the filling degree of the chutes and electrically connected to said contactor for energizing said motor in dependence upon said filling degree.

23. With a cash register in combination, a coin sorting apparatus comprising a coin hopper, coin stacking chutes for respectively different coin denominations, a coin sorting rail arranged at a slight inclination above said coin stacking chutes, an electrically driven feeder device associated with said coin hopper and including a rotatable disc for feeding coins individually and sequentially from said hopper to said sorting rail, dispensing means for issuing coins from said chutes, said coin feeder device having discriminating means for passing coins of different denominations into said respective chutes, said cash register having electric contact means actuable in dependence upon occurrence of a totalizing operation, said coin feeder device and said dispensing means having respective electric drives, and relay circuits connecting said drives with said contact means for controlling both said drives in dependence upon totalizing operation of said cash register.

24. With a cash register in combination, a coin sorting apparatus comprising coin stacking chutes for respectively different coin denominations, dispensing means for issuing coins from said chutes, a coin feeder device having discriminating means for passing coins of different denominations into said respective chutes, said coin feeder means having a drive motor and a control circuit for said motor, said chutes having respective feeler contacts responsive to the filling degree of the chutes and electrically connected to said control circuit for deenergizing said motor when all of said chutes are filled.

25. A coin sorting apparatus according to claim 1, comprising a coin guide rail extending from said coin feeder device to and along said chutes and forming a rollway for coins issuing from said feeder device, said rail having protuberance means forming a line engagement for the coins along said rollway.

26. In a coin sorting apparatus according to claim 24, said protuberance means of said guide rail consisting of smooth rods of approximately semicircular cross section joined longitudinally with said rail and bulging away therefrom.

27. In coin sorting apparatus according to claim 1, said feeder device comprising a hopper for coins, a rotatable feeder disc at the hopper bottom, said disc having an opening to receive coins, a fixed cam mounted near said disc and forming for the coins in said opening a supporting surface of varying width to permit passage of only one coin at a time.

28. In coin sorting apparatus according to claim 1, said feeder device comprising a hopper for coins, a rotatable feeder disc at the hopper bottom, said disc having an opening to receive coins and having a ring-shaped groove, a fixed cam structure engaging said groove and forming for the coins in said opening a supporting surface of varying width to permit passage of only one coin at a time.

References Cited by the Examiner

UNITED STATES PATENTS

| | | | |
|---|---|---|---|
| 1,076,584 | 10/1913 | Kohler | 133—3 |
| 1,143,290 | 6/1915 | Lippincott | 235—7.1 |
| 1,172,195 | 2/1916 | Carter et al. | 235—7.1 |
| 1,356,379 | 10/1920 | McDermott | |
| 1,823,829 | 9/1931 | Jones | 133—3 |

(Other references on following page)

UNITED STATES PATENTS

| | | | |
|---|---|---|---|
| 1,842,019 | 1/1932 | Godefroid | 133—3 |
| 2,114,559 | 4/1938 | Errera | 133—2 |
| 2,127,642 | 8/1938 | Dieserud | 133—2 |
| 2,351,197 | 6/1944 | Francis | 133—3 |
| 2,519,357 | 8/1950 | Daugherty | 133—3 |
| 2,567,900 | 9/1951 | Winkler | 133—3 |
| 2,805,675 | 9/1957 | Noyes. | |
| 2,881,774 | 4/1959 | Labbe | 133—2 |
| 2,906,276 | 9/1959 | Blanchette et al. | 133—3 |
| 2,972,442 | 2/1961 | Goodbar. | |
| 3,006,538 | 10/1961 | Deutsch. | |
| 3,061,184 | 10/1962 | Becker | 235—7.1 |
| 3,086,536 | 4/1963 | Klopp | 133—3 |

FOREIGN PATENTS 321,704  6/1957  Switzerland.

LEO SMILOW, *Primary Examiner*.